J. D. BURKHOLDER.
SCALE.
APPLICATION FILED NOV. 2, 1910.
1,096,096.
Patented May 12, 1914.
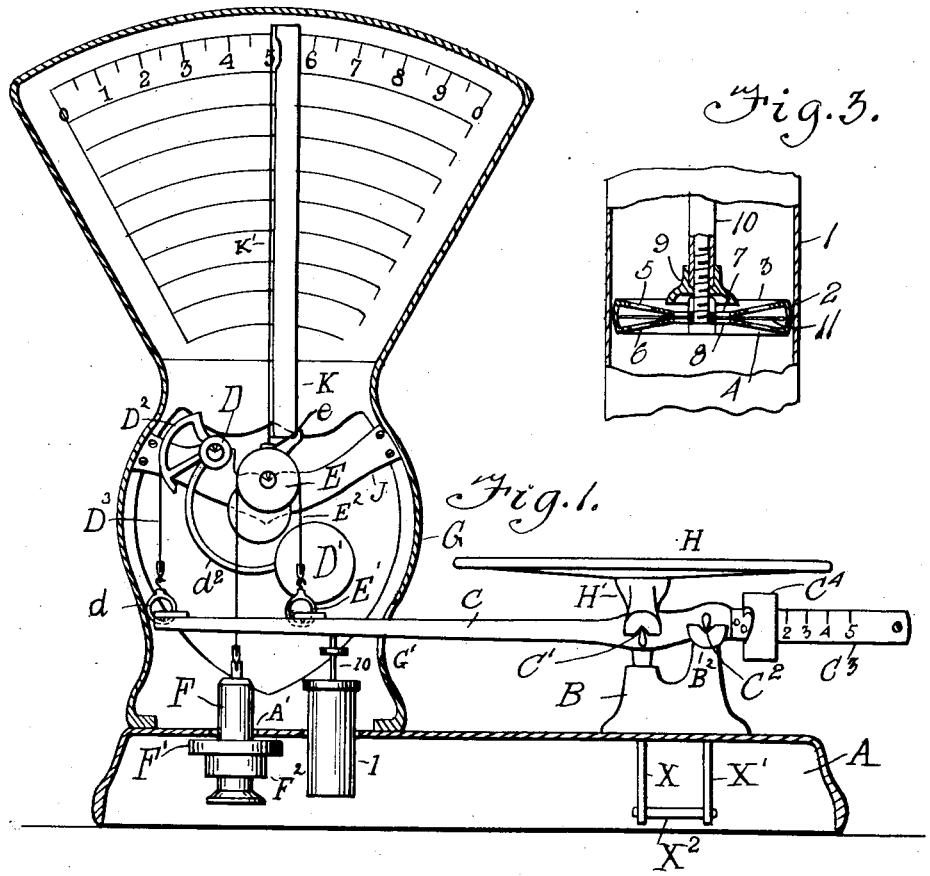
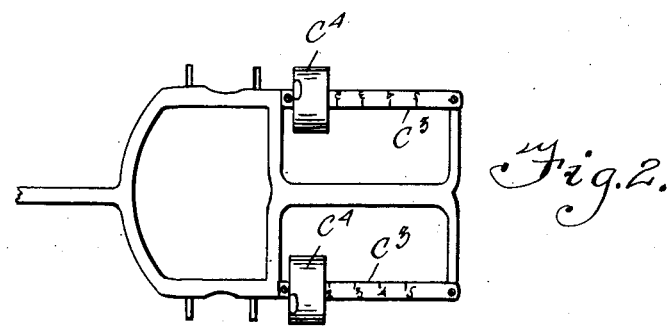
WITNESSES
INVENTOR
John D. Burkholder,
by Frank Ackerman
Attorney

UNITED STATES PATENT OFFICE.

JOHN D. BURKHOLDER, OF LANCASTER, PENNSYLVANIA, ASSIGNOR TO TOLEDO SCALE COMPANY, OF TOLEDO, OHIO, A CORPORATION OF NEW JERSEY.

SCALE.

1,096,096.  Specification of Letters Patent.  Patented May 12, 1914.

Application filed November 2, 1910. Serial No. 590,351.

*To all whom it may concern:*

Be it known that I, JOHN D. BURKHOLDER, a citizen of the United States of America, and resident of Lancaster, in the county of Lancaster and State of Pennsylvania, have invented certain new and useful Improvements in Scales, of which the following is a specification.

This invention relates to automatic or computing scales and more particularly to that class of such devices in which an indicator hand moves over the face of a chart bearing numerals indicating the weight of the article being weighed and also the values at certain prices per pound. It will be apparent, however, that my invention is not limited to such scales but, with certain modifications, may be applied to a variety of kindred devices.

Referring now to the drawings forming a part of this application, Figure 1 shows a scale in longitudinal vertical section with the working parts however shown in elevation; Fig. 2 is a fragmentary view in plan of the tare devices and Fig. 3 is a central vertical section through the barrel of a dash pot employed in connection with my improved scale.

The particular embodiment of my invention shown in the drawings will now be described in detail but it is to be understood that it is merely illustrative of the invention which is not limited to any of the details therein shown except so far as they may be specified in the following claims.

A cast metal base A supports at one end an irregular shaped housing G for the indicator and counterbalance mechanisms and near the other end a standard B which carries the fulcra or supports $B^2$ for the beam C. The latter may be and preferably is of cast metal and formed at its left-hand end into a single arm or blade but at its right-hand end into an open frame of considerable breadth which bears at opposite sides the knife edges $C^2$ which rest upon the supports formed on the standard B. Opon one side of the beam knife edges and at a short distance therefrom the beam is provided with upwardly directed knife edges $C'$ which receive the bearings on the spider $H'$ of the platform H. Upon the opposite side of the fulcra from that which supports the platform the beam is extended centrally in T form and between the outer ends of the T frame and the open frame heretofore referred to extend a pair of tare beams $C^3$ disposed symmetrically upon opposite sides of the beam; tare weights $C^4$ coöperate with these tare beams in the usual manner. At its left-hand end the beam C extends into the housing G, an opening $G'$ being formed therein for the purpose and to permit ample movement of the weighing beam. Within the housing a pair of bridges extend from one edge of the housing to the other, but one of the bridge pieces, however, being shown in the drawing, and serve as a support for the operating parts which are pivoted thereto.

The indicator arm K is mounted upon a hub E which is pivoted upon knife edges resting upon supports upon the bridge pieces J. The indicator hand or finger K may be of any suitable or desired form but is shown as consisting of a flat strip supporting in alinement and parallel therewith a reading wire $K'$. The indicator is connected to the beam by means of a flexible strap $E^2$ attached at one end to the beam C by means of a stirrup $E'$ engaging a knife edge upon the beam. The flexible strap $E^2$ passes over and around the hub E to which it is secured as by a screw $e$ and carries at its other end a weight F depending through an opening $A'$ formed in the base for this purpose. The weight F exerts a lifting effect upon the elongated end of the beam C and to this extent aids in counterbalancing the weight of the platform H. The tare weights $C^4$ also assist in this result and thereby together with their service as tare weights perform a double function. The lifting effect of the weight F however has the very substantial advantage that it serves to relieve rather than to increase the weight supported by the fulcrum knives of the lever whereby the scale is made more sensitive and the life of the knives is prolonged. The weight F is formed at its lower end with a collar $F^2$ by which the auxiliary weight $F'$ may be supported if desired to increase the weighing capacity of the scale.

The variable or differential pendulum counterpoise which is employed comprises a hub D carrying suitable knife edges which are supported upon the bridges J and a pendulum weight $D'$ connected to the hub by a curved body member $d^2$, the curve of which is necessary to escape contact with the hub E of the indicator mechanism. The pendulum is connected to the beam at its outer end by means of a usual eccentric quadrant D², flexible strap D³ and stirrup d. It will thus be seen that I have provided a scale in which the pendulum counterbalance is mounted independently of the indicator arm so that the knife edges of the latter are relieved of the weight of the pendulum and any tendency to lateral displacement thereby and the pendulum mechanism may be readily removed or repaired without disturbing the indicator mechanism.

At 1 I have shown a dash pot mounted upon the base A and having its plunger connected by the rod 10 to the scale beam. For the purpose of this application the precise construction of the dash pot is immaterial but it is shown in section in Fig. 3 and may be briefly described as follows: Within the barrel 1, which may contain oil or similar fluid, the plunger rod 10 carries the hollow plunger 2 having the upper and lower walls 3—4 provided with apertures 5—6 near the peripheries thereof and apertures 7—8 near the center. Upon the plunger rod is adjustably mounted a collar 9 which is caused to approach or recede from the opening 7—8 to control the passage of liquid therethrough and within the plunger head is mounted a flexible plate 11 which is adapted to be flexed by the rush of liquid to close or partially close the openings 5 or 6 depending upon the direction in which impulse is given to the plunger. Thus, if a violent impulse downward is given, the flexible plate tends to close the openings in the upper face of the plunger and if the impulse is in the opposite direction the plate tends to close the openings in the lower face of the plunger. Thus, the dash pot serves to check any violent movement of the beam. The platform H has the usual check link mechanism X' and X² concealed within the base of the scale.

I claim:

1. In a weighing apparatus, the combination of a price computing tablet having graduations thereon, an indicator movable over the face of the tablet, said indicator having a hub with trunnions thereon, means for supporting the trunnions, a scale lever, a flexible member connected to the lever and extending from the hub of the indicator, and a changeable weight on the flexible member.

2. In a weighing apparatus, the combination of a price computing tablet having graduations thereon, an indicator movable over the face of the tablet, said indicator having a hub with trunnions thereon, means for supporting the trunnions, a scale lever, a flexible member connected to the lever and extending from the hub of the indicator, a changeable weight on the flexible member, and a dash pot for limiting the movement of the lever.

3. In a weighing apparatus, the combination of a price computing tablet having graduations thereon, an indicator movable over the face of the tablet, said indicator having a hub with trunnions thereon, means for supporting the trunnions, a scale lever, a flexible member connected to the lever and extending from the hub of the indicator, a changeable weight on the flexible member, and an oscillatory arm connected to said lever.

4. In a weighing apparatus, the combination of a price computing tablet having graduations thereon, an indicator movable over the face of the tablet, said indicator having a hub with trunnions, a scale lever, a flexible member connected to the lever and extending from the hub of the indicator, a changeable weight on the flexible member, an oscillatory arm connected to said lever, and a dash pot connected to said lever.

5. In a weighing apparatus, a platform support having duplicate bearings, a scale lever having duplicate trunnions adapted for pivotal support in the aforesaid bearings, tare beams on each side of said lever, poises on said beams, a commodity holding member pivotally supported on said lever, an oscillating weighing member connected to said lever, an oscillating indicating member flexibly connected to said lever between its pivotal supports, and the aforesaid weighing members connected with the same, a graduated chart coacting with said indicating member, a weight flexibly connected to said indicating member, an extra capacity weight adapted for intermittent connection to aforesaid indicator weight, and a dash pot connected to said lever.

6. In a device of the class described, a main beam C pivoted near one end and carrying the scale pan adjacent its pivotal point but on the long arm of the beam, a pendulum D', an eccentric segment D² rigid with the pendulum, a strap D³ coöperating with the segment and connected to the beam, an indicator chart, an indicator hand K coöperating with the chart, a hub E upon the indicator hand and a strap E² connected at one end to the beam passing around the hub and secured to a weight at the other end, and a dash-pot for reducing the vibration of the beam.

In testimony whereof, I hereunto affix my signature in the presence of two witnesses.

JOHN D. BURKHOLDER.

Witnesses:
 CHAS. E. LONG,
 W. J. MINGLE.